(12) United States Patent
Handa (10) Patent No.: US 10,167,999 B2
(45) Date of Patent: Jan. 1, 2019

(54) GAS FILLING METHOD

(71) Applicant: HONDA MOTOR CO., LTD., Tokyo (JP)

(72) Inventor: Kiyoshi Handa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/259,586

(22) Filed: Sep. 8, 2016

(65) Prior Publication Data

US 2017/0074458 A1 Mar. 16, 2017

(30) Foreign Application Priority Data

Sep. 10, 2015 (JP) .................. 2015-178742

(51) Int. Cl.
 *B65B 1/04* (2006.01)
 *F17C 5/06* (2006.01)
 (Continued)

(52) U.S. Cl.
 CPC ................ F17C 5/06 (2013.01); F17C 1/005 (2013.01); F17C 5/007 (2013.01); F17C 13/04 (2013.01); F17C 13/084 (2013.01); *F17C 2201/056* (2013.01); *F17C 2205/0326* (2013.01); *F17C 2205/0332* (2013.01);
 (Continued)

(58) Field of Classification Search
 CPC ........ F17C 1/005; F17C 13/04; F17C 13/084; F17C 2201/056; F17C 2205/0326; F17C 2205/0335; F17C 2221/012; F17C 223/035; F17C 223/0123; F17C 2250/032; F17C 2250/0434; F17C 2250/0626; F17C 2260/025; F17C 2270/0763; F17C 5/06
 See application file for complete search history.

(56) References Cited

U.S. PATENT DOCUMENTS 8,091,593 B2 1/2012 Allidieres
2007/0186982 A1* 8/2007 Cohen ..................... F17C 5/007
 137/487.5

(Continued)

FOREIGN PATENT DOCUMENTS

JP H08-100898 A 4/1996
JP 2009-510352 A 3/2009
(Continued)

*Primary Examiner* — Jason K Niesz
(74) *Attorney, Agent, or Firm* — Squire Patton Boggs (US) LLP (57) ABSTRACT

Provided is a gas filling method capable of accurately determining the initial pressure in a tank while minimizing increase in temperature and pressure regardless of the capacity of the tank. The gas filling method for connecting a supply source to a tank via a piping, and filling the tank with the gas, the method includes: an initial-filling initiation step of opening a flow control valve provided in the piping to start initial filling; a pressure-variation acquisition step of obtaining a pressure variation per unit time at a predetermined detection point downstream of the flow control valve in the piping; an initial-pressure detection step of obtaining a pressure at the detection point at a time specified using the pressure variation, and considering that pressure as the initial pressure in the tank; and a main-filling initiation step of starting main filling using the initial pressure.

17 Claims, 7 Drawing Sheets

(51) Int. Cl.
  *F17C 1/00* (2006.01)
  *F17C 13/04* (2006.01)
  *F17C 13/08* (2006.01)
  *F17C 5/00* (2006.01)

(52) U.S. Cl.
  CPC .......... *F17C 2205/0335* (2013.01); *F17C 2221/012* (2013.01); *F17C 2223/0123* (2013.01); *F17C 2223/035* (2013.01); *F17C 2223/036* (2013.01); *F17C 2225/0123* (2013.01); *F17C 2225/035* (2013.01); *F17C 2225/036* (2013.01); *F17C 2227/0337* (2013.01); *F17C 2227/0388* (2013.01); *F17C 2250/032* (2013.01); *F17C 2250/034* (2013.01); *F17C 2250/043* (2013.01); *F17C 2250/0434* (2013.01); *F17C 2250/0439* (2013.01); *F17C 2250/0443* (2013.01); *F17C 2250/0626* (2013.01); *F17C 2250/0636* (2013.01); *F17C 2260/025* (2013.01); *F17C 2265/065* (2013.01); *F17C 2270/0139* (2013.01); *F17C 2270/0763* (2013.01)

(56) References Cited

U.S. PATENT DOCUMENTS

| 2009/0151812 | A1 | 6/2009 | Allidieres | |
| 2012/0216910 | A1* | 8/2012 | Inagi | F17C 5/06 141/4 |
| 2013/0037165 | A1* | 2/2013 | Okawachi | F17C 5/06 141/4 |

FOREIGN PATENT DOCUMENTS

| JP | 2011-112213 A | 6/2011 |
| JP | 2011-231799 A | 11/2011 |
| WO | WO 2011/058782 A1 | 5/2011 |
| WO | 2011/132063 A8 | 10/2011 |

* cited by examiner

FILLING STATION SECTION
+ VEHICLE SECTION
+ HYDROGEN TANK

FILLING STATION SECTION
+ VEHICLE SECTION

FILLING STATION SECTION

STATION PRESSURE
TANK PRESSURE
INITIAL PRESSURE

PRESSURE-LOSS DETERMINATION THRESHOLD

WHEN THE STATION PRESSURE IS LOWER THAN THE PRESSURE-LOSS DETERMINATION THRESHOLD, THE STATION PRESSURE AFTER THE FLOW RATE IS REDUCED IS TAKEN AS THE INITIAL PRESSURE

LOW TANK RESIDUAL PRESSURE CAUSES LARGE PRESSURE LOSS

INITIAL-PRESSURE DETERMINATION THRESHOLD

PRESSURE (圧力)

PRESSURE VARIATION (dp/dm)

TIME

GAS FILLING METHOD

This application is based on and claims the benefit of priority from Japanese Patent Application No. 2015-178742, filed on 10 Sep. 2015, the content of which is incorporated herein by reference.

BACKGROUND OF THE INVENTION

Field of the Invention

The present invention relates to a gas filling method. More specifically, the present invention relates to a gas filling method including connecting a supply source of a compressed gas to a tank mounted on a mobile object, and filling the tank with the gas.

Related Art

A fuel cell vehicle runs on a motor powered by a fuel cell where air containing oxygen and hydrogen gas as a fuel gas supplied thereto generate electricity. Fuel cell vehicles, in which those fuel cells are used as energy sources for generating power, recently have been becoming closer to practical use. Hydrogen gas is required to generate electricity in a fuel cell. A recent mainstream fuel cell vehicle uses tank-filled hydrogen gas for running, in which a sufficient amount of hydrogen gas has been stored in a high-pressure tank or a hydrogen tank comprising an occluding alloy. Accordingly, filling technologies for quickly filling a tank with as much hydrogen gas as possible have also been actively explored.

Patent Document 1 discloses a table where a relationship is determined between a tank pressure (hereinafter, may simply be referred to as "initial pressure") and temperature (hereinafter, may simply be referred to as "initial temperature") just before starting main filling and a filling flow rate (or a rate of pressure increase) in main filling suitable for these. In the invention according to Patent Document 1, hydrogen gas is transferred to a tank of a vehicle from a hydrogen station at a filling flow rate determined using the aforementioned table for main filling. In order to achieve such a rapid filling, a technology are required for allowing a hydrogen station which controls a filling flow rate to accurately determine the initial pressure of a tank of a vehicle.

Figure 7:
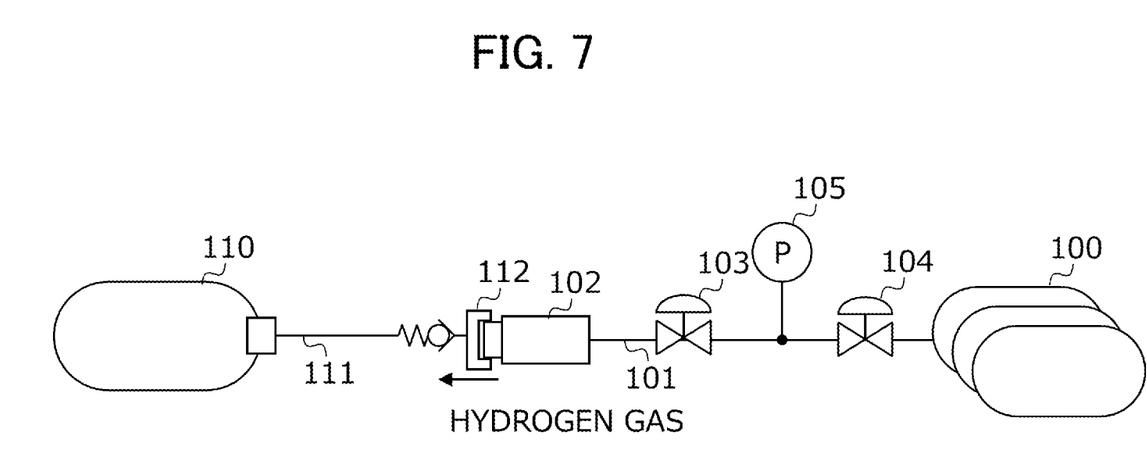
FIG. 7 schematically shows a procedure for the gas filling method called the pre-shot method.

FIG. 7 schematically shows a procedure for the gas filling method called the pre-shot method. With reference to FIG. 7, a filling nozzle 102 provided at the front end of a station piping 101 extending from a compressed gas supply source 100 of a hydrogen station is connected to a receptacle 112 provided at the front end of a vehicle piping 111 extending from a tank 110 of a vehicle. This connection between the compressed gas supply source 100 and the tank 110 through a single piping enables hydrogen gas to be transferred to the tank 110 from the compressed gas supply source 100.

According to the pre-shot method, a flow control valve 103 provided in the station piping 101 is first fully closed, and a cutoff valve 104 provided upstream thereof is then opened with the flow control valve 103 closed, and the inside of the station piping 101 is pressurized until an output from a pressure sensor 105 provided upstream of the flow control valve 103 shows a predetermined value, and then the cutoff valve 104 is closed. This allows a section between the flow control valve 103 and the cutoff valve 104 in the station piping 101 to be filled with a certain amount of compressed hydrogen gas depending on the pressure. Subsequently, when the flow control valve 103 is opened with the cutoff valve 104 closed, high-pressure hydrogen gas stored inside the station piping 101 flows into the tank 110 at once to equalize the pressures in the tank 110 and the station piping 101. In this way, the pre-shot method can quickly determine the pressure in the tank 110 before starting main filling, i.e., the initial pressure in the tank, using the pressure sensor 105 provided at the station piping 101.

Patent Document 1: PCT International Publication No. WO2011/058782

SUMMARY OF THE INVENTION

As described above, the pre-shot method involves transferring a certain amount of hydrogen gas depending on the degree of pressurization of the station piping 101 before opening the flow control valve 103. Further, the station side can not determine the accurate capacity of the tank 110 immediately after connecting the filling nozzle 102 to the receptacle 112. Consequently, a predetermined amount of hydrogen gas will be transferred into the tank 110 regardless of its capacity when the pre-shot method is used. Therefore, the pre-shot method may induce rapid increase in the pressure and temperature of a connected tank if that tank has a capacity excessively smaller than commonly expected.

Further, the initial pressure determined using the pre-shot method represents a pressure in a hydrogen tank after filled with a certain amount of hydrogen gas depending on the degree of pressurization, and may be higher than the tank internal pressure just before starting filling. Therefore, it is not accurate.

An object of the present invention is to provide a gas filling method capable of accurately detecting the initial pressure in a connected tank with increase in temperature and pressure controlled regardless of the capacity of the tank.

(1) A gas filling method including connecting a supply source of compressed gas (for example, a pressure accumulator 91 as described below) to a tank (for example, a hydrogen tank 31 as described below) mounted on a mobile object (for example, a fuel cell vehicle V as described below) via a piping (for example, a station piping 93 and a vehicle piping 39 as described below), and filling the tank with the gas from the supply source, comprises: an initial-filling initiation step (for example, S2 as described below) of opening a flow control valve (for example, a flow control valve 94b as described below) provided in the piping to start initial filling;
a pressure-variation acquisition step (for example, S3 as described below) of obtaining a pressure variation per unit time or per unit mass at a predetermined detection point downstream of the flow control valve in the piping; an initial-pressure detection step (for example, S4 in FIG. 3 or S21 in FIG. 6 as described below) of obtaining a pressure at the detection point at a time specified using the pressure variation, and taking that pressure as the initial pressure in the tank; and a main-filling initiation step (for example, S7 as described below) of starting main filling using the initial pressure.

(2) In this case, the flow control valve is preferably controlled so that the flow rate of the gas which flows through the piping is constant in the initial filling.

(3) In this case, the pressure at the detection point is obtained when the pressure variation becomes a predetermined initial-pressure determination threshold or less (for example, the initial-pressure determination threshold as described below), and that pressure is preferably taken as the initial pressure in the initial-pressure detection step.

(4) In this case, if the pressure at the detection point when the pressure variation becomes the predetermined initial-pressure determination threshold or less becomes higher than a predetermined pressure-loss determination threshold, that pressure is preferably taken as the initial pressure in the initial-pressure detection step.

(5) In this case, the gas filling method further comprises a pressure-loss reducing step of reducing the flow rate of the gas which flows through the piping if the pressure at the detection point when the pressure variation becomes the predetermined initial-pressure determination threshold or less becomes the predetermined pressure-loss determination threshold or less after starting the initial filling, and the initial-pressure detection step comprises obtaining a pressure at the detection point after reducing the flow rate of the gas in the pressure-loss reducing step, and that pressure is preferably taken as the initial pressure.

(6) In this case, preferably, the gas filling method further comprises a filling stop step (for example, S10 as described below) of stopping filling if the pressure variation does not become the initial-pressure determination threshold or less within a predetermined time after starting the initial filling.

(7) In this case, the piping comprises an upstream piping including a filling nozzle for discharging the gas and the flow control valve and connected to the supply source, and a downstream piping including a receptacle capable of being fitted with the filling nozzle and connected to the tank, in which the detection point is located between the flow control valve and the filling nozzle in the upstream piping, and two check valves are provided in the downstream piping, and in the initial-pressure detection step, the pressure variation is assumed to decrease in two steps in a stepwise manner, and a pressure at the detection point is obtained when the pressure variation shows the second steepening after starting the initial filling, and that pressure is preferably taken as the initial pressure.

(8) In this case, preferably, the gas filling method further comprises a filling stop step of stopping filling if the pressure variation does not show the second steepening within a predetermined time after starting the initial filling.

(9) In this case, preferably, the piping comprises an upstream piping (for example, a station piping 93 as described below) including a filling nozzle (for example, a filling nozzle 92 as described below) for discharging the gas and the flow control valve and connected to the supply source, and a downstream piping (for example, a vehicle piping 39 as described below) including a receptacle (for example, a receptacle 38 as described below) capable of being fitted with the filling nozzle and connected to the tank, in which the detection point is located between the flow control valve and the filling nozzle in the upstream piping, and the gas filling method further comprises a depressurization step (see S8 as described below) of reducing a pressure at the detection point in the upstream piping below a predetermined minimum residual pressure expected in the tank after the end of main filling but before the start of a next initial filling.

(10) In this case, preferably, the mobile object comprises the tank, a tank internal pressure sensor (for example, a tank internal pressure sensor 42 as described below) for detecting pressure in the tank and a transmitter (for example, an infrared communication device 5 as described below) for transmitting information about a tank internal pressure detected with the tank internal pressure sensor, and the gas filling method further comprises a communication step of obtaining the information about the tank internal pressure transmitted from the transmitter before starting the initial-filling initiation step, and in the initial-filling, the flow rate of the gas is increased as a pressure in the tank estimated with the information obtained in the communication step increases.

(1) A check valve is provided in a tank mounted on a mobile object to keep holding a high-pressure gas in the tank. Further, this check valve is closed due to the residual pressure in the tank before connecting a supply source to the tank through a piping and opening a flow control valve to start filling. This means that the inside of the piping is thermodynamically separated from the inside of the tank. When the flow control valve is opened from such a state to start gas supply, only the pressure in the piping show an initial increase with the check valve still closed. Once the pressure in the piping reaches the pressure in the tank at that time (i.e., the initial pressure), then the check valve is opened to allow the gas in the piping to start flowing into the tank. In this case, the volume of the target system is rapidly increased by the amount of the capacity of the tank when the check valve is opened. Consequently the pressure variation (the amount of pressure increase per unit time or per unit mass) at a predetermined detection point downstream of the flow control valve in the piping is rapidly decreased due to the rapid volume increase in the system. The present invention takes advantage of the above phenomenon. That is, a pressure at the detection point at a time specified using the pressure variation in the piping after starting initial filling is taken as the initial pressure, and subsequent main filling is started using that initial pressure. According to the present invention, the initial pressure can be obtained at a time when the check valve is opened as described above. This can minimize the gas inflow into the tank. Further, this can allow the initial pressure in a connected tank to be accurately determined while minimizing increase in temperature and pressure regardless of the capacity of the tank.

(2) According to the present invention, the initial pressure can be obtained as described above by taking advantage of the rapid decrease in the pressure variation associated with the rapid increase in the volume of the system during initial filling. Therefore, a significant volume increase can be detected as a decreased pressure variation when the flow rate of a gas which flows through a piping is substantially constant before and after the rapid volume change. This can appropriately determine timing for obtaining the initial pressure.

(3) As described above, the pressure variation may be rapidly decreased in response to the increase in the capacity of a tank. According to the present invention, this rapidly decreased pressure variation can directly be detected. Therefore, a pressure at the detection point can be taken as the initial pressure when the pressure variation in the piping becomes a predetermined initial-pressure determination threshold or less after starting initial filling, i.e., when the check valve is opened due to the pressure at the detection point in the piping which is substantially equalized to the pressure in the tank. This can allow the initial pressure to be obtained at an appropriate timing when the check valve is presumably opened.

(4) Pressure loss may occur in the piping when a gas is supplied to a tank from a supply source after the tank is connected to the supply source through a piping. This pressure loss may become larger as the pressure in the tank decreases and the volume flow rate of a gas increases. Further, increased pressure loss may increase the pressure difference between the pipings in the supply source side and the tank side. If that is the case, the pressure at the detection point when the check valve is opened may not be reasonably used as the initial pressure. According to the present invention, if a pressure at the detection point when the pressure variation in the piping becomes an initial-pressure determination threshold or less after starting initial filling is higher than a predetermined pressure-loss determination threshold, i.e., if the pressure in the tank is found to be sufficiently high, and the pressure loss is found to be less significant, the pressure at the detection point when the pressure variation in the piping becomes the initial-pressure determination threshold or less can be taken as the initial pressure. This can allow the initial pressure to be determined accurately under the influence of pressure loss.

(5) According to the present invention, if a pressure at the detection point when the pressure variation in the piping becomes an initial-pressure determination threshold or less is higher than the predetermined pressure-loss determination threshold, i.e., if the pressure in the tank is too low to ignore the influence of pressure loss, the flow rate may be reduced to decrease the pressure loss in the piping and to reduce the pressure difference between the supply source side and the tank side, and then a pressure at the determination point can be obtained again, and that pressure can be taken as the initial pressure. This can allow the initial pressure in a tank with a low residual pressure to be determined accurately. Further, according to the present invention, the flow rate is reduced after the pressure in a tank is found to be low. Otherwise, the flow rate of every tank may need to be reduced during initial filling to accurately determine the initial pressure, and thus unnecessarily prolonged time may be required for determining the initial pressure. The present invention can prevent this.

(6) The smaller is the capacity of a connected tank as the smaller is the pressure variation when a check valve is opened. Therefore, when the pressure variation does not become an initial-pressure determination threshold or less even after a certain time has passed since the start of initial filling, the capacity of that connected tank can be considered to be relatively small. Therefore, according to the present invention, when the pressure variation does not become an initial-pressure determination threshold or less within a predetermined time after starting initial filling, filling can be stopped, thereby stopping gas filling to a small tank with a non-standard capacity.

(7) Two check valves may be provided in the downstream piping mounted on the mobile object. Consequently, the target system may be divided into the following sub-systems: a system with a relatively small volume comprising a section from the supply source to a first check valve, a system with a relatively small volume comprising a section from the first check valve to a second check valve and a system with the largest volume comprising a section from the second check valve to the inside of the tank. This may be responsible for the phenomenon where the pressure variation is rapidly decreased in two steps in a stepwise manner after starting initial filling, and the pressure variation further shows the largest steepening at a time when a second check valve is opened. The present invention takes advantage of this to obtain a pressure at the detection point when the pressure variation shows the second steepening after starting initial filling, and that pressure can be taken as the initial pressure. This can allow the initial pressure to be obtained at an appropriate timing when the second check valve is presumably opened to establish communication between the inside of the tank and the supply source.

(8) According to the present invention, if the pressure variation does not show the second steepening within a predetermined time after starting the initial filling, filling can be stopped, thereby stopping gas filling to a small tank with a non-standard capacity based on the same reason as in the embodiment (6) of the present invention.

(9) When determining the initial pressure in a tank by the gas filling method according to the present invention, the check valve at the tank needs to be closed when initial filling is started. According to the present invention, a pressure at the detection point in the upstream piping may be maintained lower than a predetermined minimum residual pressure expected for the tank after the completion of main filling but before the start of a next initial filling. This can ensure that the pressure in the piping is lower than the pressure in the tank such that the check valve at the tank is in the closed position when initial filling is started. Therefore, the present invention can reliably determine the initial pressure even when the residual pressure in the tank is low.

(10) When the pressure in a connected tank is high, more time may be required for the pressure in the piping to reach the pressure in the tank to allow a check valve to be opened after starting initial filling. Consequently, more time may be required to obtain the initial pressure for starting main filling. Accordingly in the present invention, for a mobile object comprising a tank internal pressure sensor and a transmitter which can transmit information about a tank internal pressure detected by the sensor, the pressure in the tank may roughly be obtained from the information transmitted from the transmitter, and then the flow rate of a gas during initial filling may be controlled according to the rough estimation. This can prevent a prolonged acquisition time of the initial pressure after starting initial filling.

DETAILED DESCRIPTION OF THE INVENTION

<First Embodiment>

Figure 1:
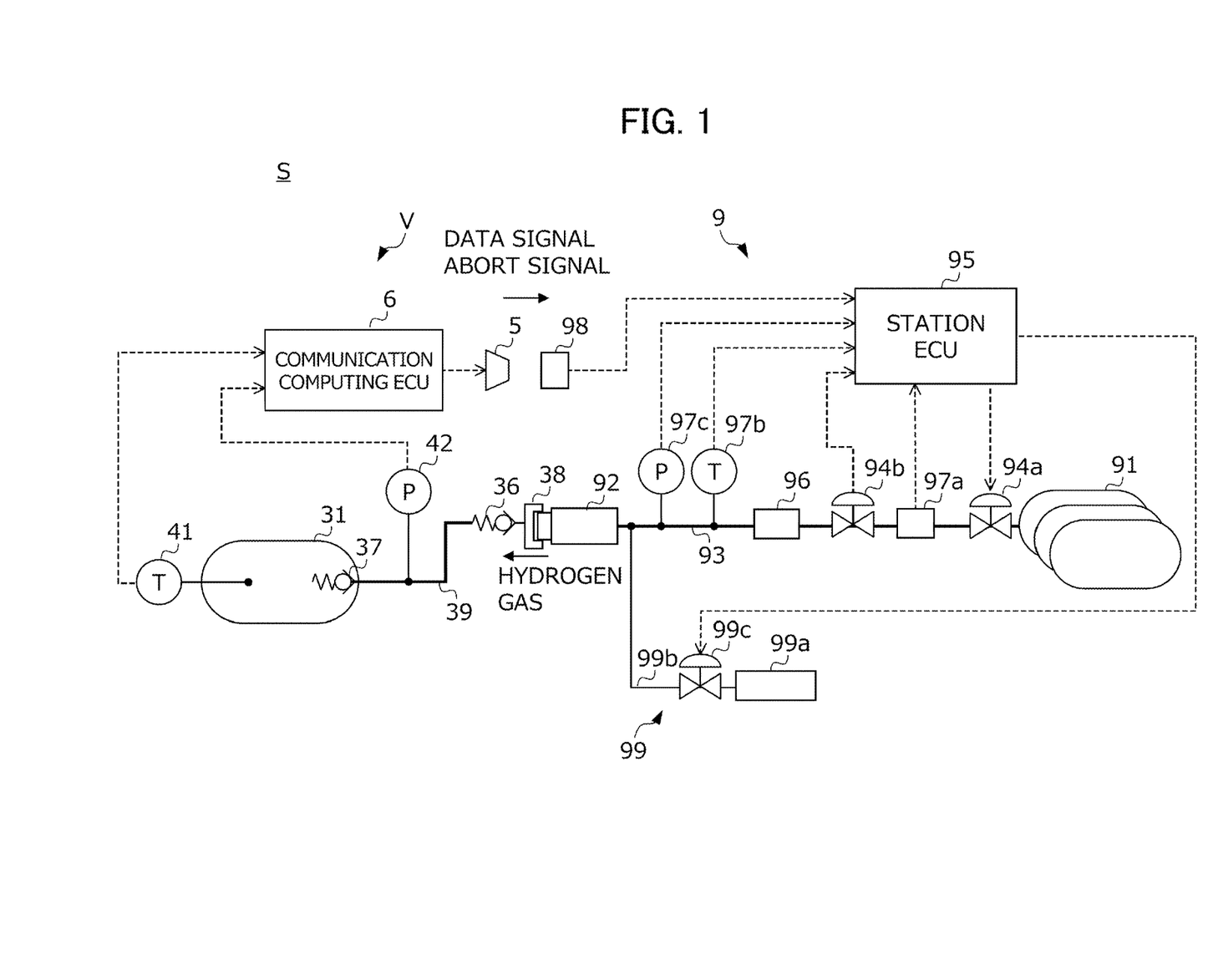
FIG. 1 shows the configuration of a hydrogen filling system in which a hydrogen gas filling method according to the first embodiment of the present invention is used.

Below, a first embodiment of the present invention will be described with reference to the figures. FIG. 1 shows the configuration of a hydrogen filling system S in which the hydrogen gas filling method according to this embodiment is used. The hydrogen filling system S includes the combination of a fuel cell vehicle V which runs on hydrogen gas as a fuel gas and a hydrogen station 9 as a supply system which supplies hydrogen gas to a hydrogen tank of the vehicles V. Below, the configuration of the hydrogen station 9 will first be described, and the configuration of the vehicle V will then be described.

The hydrogen station 9 includes a pressure accumulator 91 in which a high-pressure hydrogen gas to be supplied to the vehicle V is stored, a station piping 93 extending from the pressure accumulator 91 to a filling nozzle 92 for discharging hydrogen gas, a cutoff valve 94a and a flow control valve 94b provided in the station piping 93, a venting device 99 for handling hydrogen gas accumulating inside the station piping 93 and a station ECU 95 for controlling the valves 94a and 94b and the venting device 99.

The station ECU 95 opens/closes the cutoff valve 94a and the flow control valve 94b according to a procedure as described below with reference to FIG. 3 after the filling nozzle 92 is connected to the receptacle 38 provided in the vehicle V, and allows the hydrogen tank 31 of the vehicle V to be filled with the high pressure hydrogen gas stored in the pressure accumulator 91.

A cooling device 96 for cooling hydrogen gas is provided between the flow control valve 94b and the filling nozzle 92 in the station piping 93. The cooling device 96 can cool hydrogen gas at a location before transferred into the hydrogen tank 31, preventing an increased temperature of hydrogen gas in the hydrogen tank 31, which, in turn, enables rapid filling.

Various sensors 97a, 97b and 97c are connected to the station ECU 95 to detecting the state of hydrogen gas at a location before transferred into the hydrogen tank 31.

A flow meter 97a is provided between the cutoff valve 94a and the flow control valve 94b in the station piping 93, and transmits a signal corresponding to the mass of hydrogen gas per unit time which flows through the station piping 93, i.e., a mass flow rate [kg/sec], to the station ECU 95. Hereinafter, the mass flow rate of hydrogen gas detected by the flow meter 97a is also referred to as a filling flow rate.

A station temperature sensor 97b is provided between the flow control valve 94b and the filling nozzle 92 in the station piping 93, and transmits a signal corresponding to the temperature [° C.] of hydrogen gas inside the station piping 93 to the station ECU 95. Hereinafter, the temperature of hydrogen gas detected by the temperature sensor 97b is also referred to as a filler gas temperature.

A station pressure sensor 97c is provided between the flow control valve 94b and the filling nozzle 92 in the station piping 93, and transmits a signal corresponding to the pressure of hydrogen gas inside the station piping 93 to the station ECU 95. That is, a position for pressure detection with the station pressure sensor 97c is located between the flow control valve 94b and the filling nozzles 92 in the station piping 93. Hereinafter, the pressure of hydrogen gas detected by the pressure sensor 97c is also referred to as a station pressure.

The venting device 99 comprises a dilution device 99a for diluting hydrogen gas with nitrogen and the like; a vent pipe 99b allowing a position between the flow control valve 94b and the filling nozzles 92 in the station piping 93 to communicate with the dilution device 99a; and an open valve 99c provided in the vent pipe 99b. The station ECU 95 opens the open valve 99c at a predetermined timing such as after the completion of hydrogen gas filling or before starting hydrogen gas filling to discharge hydrogen gas accumulating inside the station piping 93 toward the dilution device 99a, allowing the pressure in the station piping 93 to be reduced to a predetermined pressure or less.

An infrared communication device 98 for communicating with the vehicle V is provided at the filling nozzle 92. The infrared communication device 98 will be directed to an infrared communication device 5 as described below provided in the vehicle V when the filling nozzle 92 is connected to the receptacle 38, allowing the transmission and reception of data signals between the communication devices 98 and 5 via infrared light.

A fuel cell vehicle V comprises a hydrogen tank 31 for storing hydrogen gas supplied from the station 9, a vehicle piping 39 extending from the hydrogen tank 31, a fuel cell system (not shown) for generating electric power using hydrogen gas stored in the hydrogen tank 31 and managing the resulting electric power for driving the vehicle, the infrared communication device 5 for transmitting a data signal about the hydrogen tank 31 to an infrared communication device 95 in the station 9 during communication filling and a communication computing ECU 6 for generating a data signal to be transmitted from the infrared communication device 5.

The vehicle piping 39 comprises a receptacle 38 capable of being fitted with the filling nozzle 92 in the hydrogen station 9; a first check valve 36 provided in the vicinity of the receptacle 38 in the vehicle piping 39 for preventing hydrogen gas from back-flowing into the receptacle 38 from the side of the hydrogen tank 31; and a second check valve 37 provided in the vicinity of the hydrogen tank 31 in the vehicle piping 39 for preventing hydrogen gas from back-flowing into the vehicle piping 39 from the hydrogen tank 31.

A tank internal temperature sensor 41 and a tank internal pressure sensor 42 as means of obtaining information about the hydrogen tank 31 are connected to the communication computing ECU 6. The tank internal temperature sensor 41 detects the temperature of hydrogen gas in the hydrogen tank 31, and transmits a signal corresponding to a detected value to the communication computing ECU 6. Hereinafter, the temperature of hydrogen gas in the hydrogen tank 31 detected by the temperature sensor 41 is also referred to as a tank internal temperature. The tank internal pressure sensor 42 detects the pressure in the hydrogen tank 31, and transmits a signal corresponding to a detected value to the communication computing ECU 6. Hereinafter, the pressure of hydrogen gas in the hydrogen tank 31 detected by the pressure sensor 42 is also referred to as a tank internal pressure.

The communication computing ECU 6 may be a computer including a microcomputer, and may comprise CPU (central processing unit), a storage media such as ROM and RAM and electronic circuits for various interfaces and the like. Unique information about the hydrogen tank 31 which has been mounted at the time of manufacture of the vehicle V may be recorded on a ROM of the communication computing ECU 6. The communication computing ECU 6 may generate data signals corresponding to a detected value T of the tank internal temperature, a detected value P of the tank internal pressure and the unique information in order to transmit the information about the hydrogen tank 31 to the station ECU 95 through the infrared communication device 5.

The infrared communication device 5 may comprise, for example, an infrared LED, a driver thereof and the like. The driver may blink the infrared LED in a manner according to a data signal, an abort signal for stopping filling and the like generated by the communication computing ECU 6. This can allow the data signal and the abort signal to be transmitted to the hydrogen station 9 from the vehicle V.

In the hydrogen filling system S configured as described above, the filling nozzle 92 provided in the hydrogen station 9 may be fitted to the receptacle 38 provided in the vehicle V. This can form an essentially single piping connecting the hydrogen tank 31 mounted on the vehicle V to the pressure accumulator 91 in the hydrogen station 9 such that the station piping 93 is connected to the vehicle piping 39 in series.

Note that the hydrogen tank 31 mounted on the vehicle V may comprise multiple subtanks. Even if that is the case, the vehicle piping 39 comprises a collecting piping extending from each subtank and merging each other before reaching one receptacle 38. Therefore, this can be viewed as an essentially single piping connecting the hydrogen tank 31 comprising multiple subtanks to the pressure accumulator 91 when the station piping 93 is connected to the vehicle piping 39 through the receptacle 38.

Figure 2:
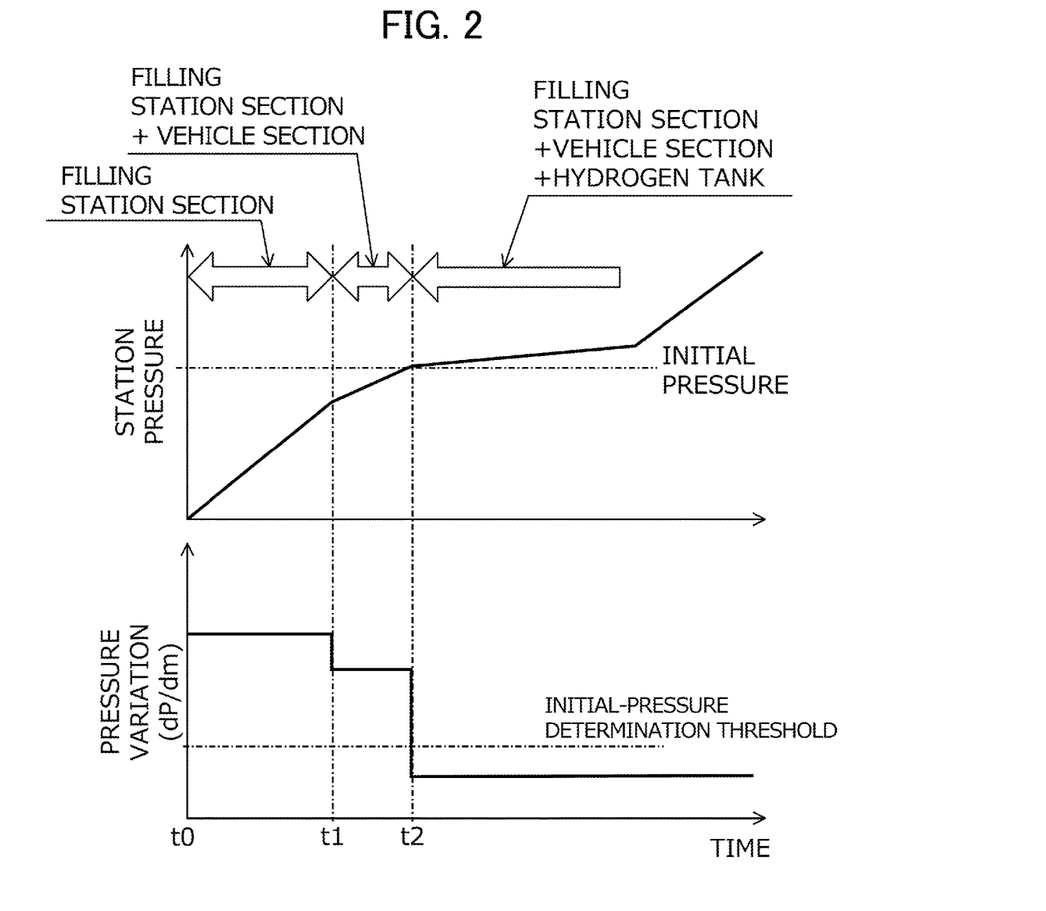
FIG. 2 is a timing diagram showing the changes in a station pressure when a hydrogen tank is filled with hydrogen gas at a constant filling flow rate in a hydrogen filling system and a pressure variation computed based on the above station pressure.

FIG. 2 is a timing diagram showing the changes in a station pressure when a hydrogen tank is filled with hydrogen gas at a constant filling flow rate in the hydrogen filling system S (see above) and a pressure variation dP/dm (the amount of change in a station pressure per unit mass [Pa/kg], see below) computed based on the above station pressure.

As described with reference to FIG. 1, a piping connecting the pressure accumulator 91 to the hydrogen tank 31 can be formed by connecting the station piping 93 to the vehicle piping 39 in series. Further, two check valves may be provided in the vehicle piping 39. Immediately after fitting the filling nozzle to the receptacle, but before opening the flow control valve in the hydrogen station to start transfer of hydrogen gas in the pressure accumulator, these two check valves may, therefore, be closed due to the residual pressure in the hydrogen tank, and the section from the flow control valve to a first check valve (hereinafter, also referred to as the "station section"), a section from the first check valve to a second check valve (hereinafter, also referred to as the "vehicle section") and the inside of the hydrogen tank may be thermodynamically separated.

When the flow control valve is opened from such a state to start hydrogen gas supply under a constant filling flow rate, the station section is first filled with hydrogen gas with the first check valve closed. Subsequently, once the pressure in the station section reaches the pressure in the vehicle section, the first check valve is opened to establish communication among the pressure accumulator, the station section and the vehicle section, allowing hydrogen gas in the station section to start flowing into the vehicle section.

When the supply of hydrogen gas is further continued, the station section and the vehicle section are filled with hydrogen gas with the second check valve closed. Then, once the pressure in the station section and the vehicle section reaches the pressure in the hydrogen tank, the second check valve is opened to establish communication among the pressure accumulator, the station section, the vehicle section and the hydrogen tank, allowing hydrogen gas in the vehicle section to start flowing into the hydrogen tank.

Hydrogen gas actually does not flow into the hydrogen tank immediately when the flow control valve is opened to start hydrogen gas supply as described above. In fact, the first check valve first is opened at Time t1 after starting hydrogen gas supply at Time t0, and then the second check valve is opened at Time t2. Only after this takes place, communication between the pressure accumulator and the hydrogen tank is established, allowing hydrogen gas to flow into the hydrogen tank.

In this case, the rate of increase in the station pressure P (i.e., the pressure in the station section) may drop at a time when the first and second check valves are opened (see Time t1, t2 in FIG. 2) when hydrogen gas continuously supplied at a constant filling flow rate as shown in the upper panel in FIG. 2. That is, the slope of the station pressure P becomes slower each time the check valves are opened. Moreover, in this case, the pressure variation computed from the station pressure P rapidly decreases in a stepwise manner at a time when the first and second check valves are opened as shown in FIG. 2.

Such characteristic behaviors of the pressure variation will be described in more detail. First, the product of the pressure P of a gas trapped inside a container having a volume V and the volume V can be expressed by the product of a compressibility factor Z, the mass m of the gas, the gas constant R and the temperature T of the gas in the container as described in the following expression (1).

$$PV = ZmRT \qquad (1)$$

Further, in the real gas equation of the expression (1), assuming a minute change in a state with the volume V kept constant (P->P+dP, Z->Z+dZ, m->m+dm, T->T+dT), the amount of change in the compressibility factor dZ and the amount of change in the temperature dT are each further allowed to approach to 0. Then the following expression (2) is derived. That is, the amount of change in the pressure of the container per unit mass (dP/dm) is in inverse proportion to the volume V of the container as shown in the following formula (2). Therefore, the stepwise behavior of the pressure variation when supplying hydrogen gas at a constant filling flow rate in the hydrogen filling system can be attributed to the two-step stepwise increase in the volume of the system when the first and second check valves are opened.

$$dP/dm = ZRT/V \qquad (2)$$

Further, the volume of a hydrogen tank is usually larger than the volumes of the vehicle section and the station section. Therefore, the magnitude of the steepening in the pressure variation which occurs at each of Times t1 and t2 (that is, the drop in the pressure variation) is larger at Time t2 when the second check valve is opened than at Time t1 when the first check valve is opened.

Further, the aforementioned characteristic behaviors of the pressure variation can be used to obtain the initial pressure which represents a pressure in the hydrogen tank when the pressure accumulator in the hydrogen station is connected to the hydrogen tank using an output of the station pressure sensor provided in the hydrogen station. That is, the second check valve is opened when the pressure of the station section and the vehicle section is substantially equalized to the pressure in a hydrogen tank with no known capacity. Therefore, it is safe to say that the station pressure P at Time t2 when the second steepening occurs in the pressure variation is substantially equal to the pressure in the hydrogen tank at that time, i.e., the initial pressure. Moreover, the initial pressure obtained by the method described above is closer to the actual pressure in the hydrogen tank just before starting filling unlike the initial pressure obtained by the aforementioned pre-shot method.

Figure 3:
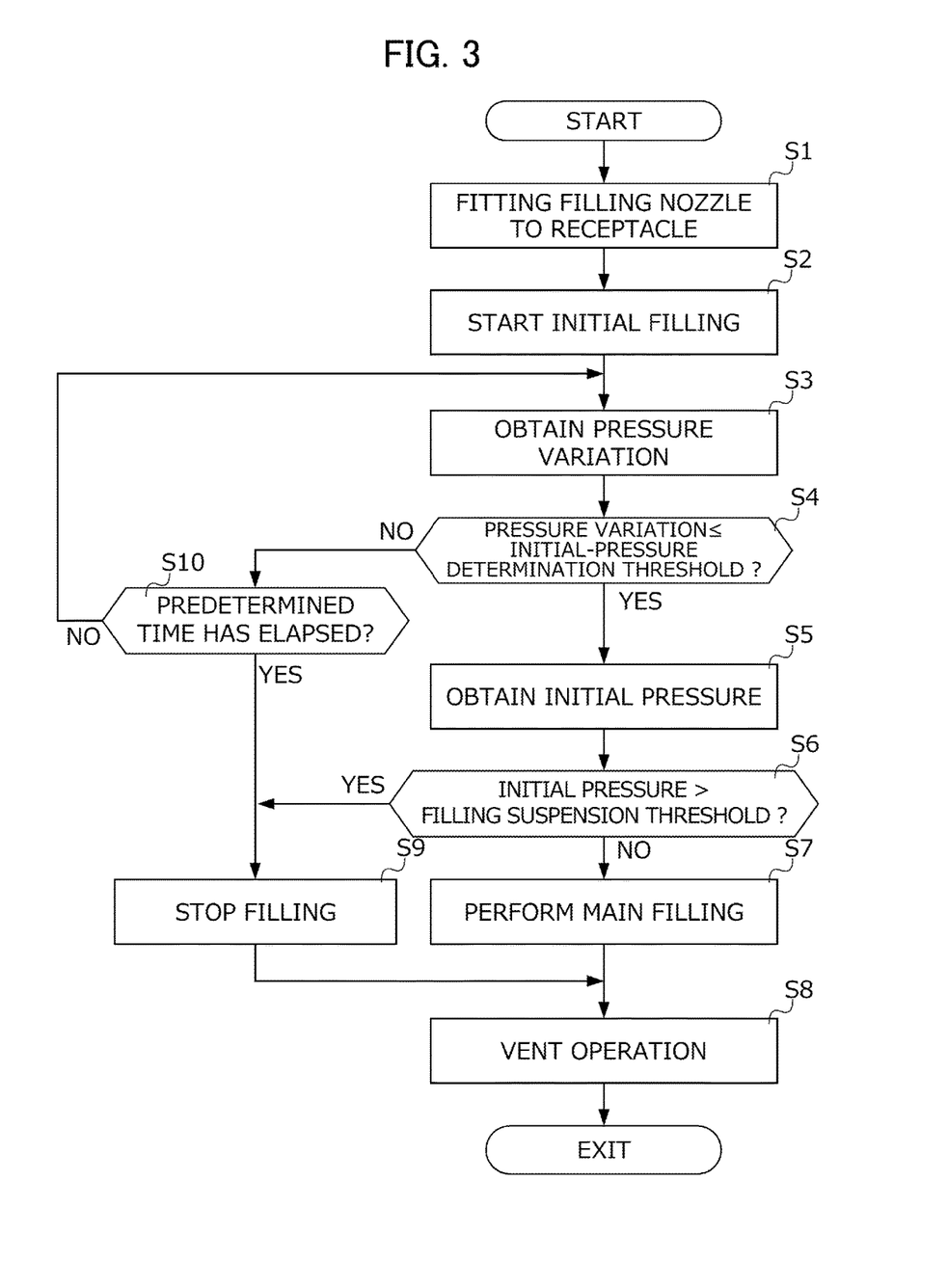
FIG. 3 is a flow chart illustrating a particular procedure for the hydrogen gas filling method according to this embodiment.

FIG. 3 is a flow chart illustrating a particular procedure of a hydrogen gas filling method including connecting a hydrogen tank mounted on a vehicle to a pressure accumulator in a hydrogen station through a piping; and filling the tank with hydrogen gas.

First in S1, an operator may fit a filling nozzle in a hydrogen station to a receptacle in a vehicle to connect a pressure accumulator as a hydrogen gas supply source in the hydrogen station to a hydrogen tank in the vehicle through a piping comprising a station piping and a vehicle piping connected in series. Note that the hydrogen station may perform a vent operation in which high-pressure hydrogen gas accumulating inside the station piping is discharged to a dilution device at each time after the completion of filling as described below in more detail (see S8 below), and thus the pressure in the station piping may be kept lower than the pressures usually expected for the vehicle piping and the hydrogen tank. Therefore, the first and second check valves provided in the vehicle piping are both in a closed state immediately after connecting the filling nozzle to the receptacle in S1.

Next, in S2, the hydrogen station may open a cutoff valve and a flow control valve provided in the station piping to start initial filling. More specifically, in this initial filling, the hydrogen station may preferably control the flow control valve using an output from a mass flow meter so that the filling flow rate of hydrogen gas which flows through the station piping is kept constant at a predetermined target value. Note that the target value for the filling flow rate of hydrogen gas during initial filling may be small enough to appropriately detect the steepening in the pressure variation and set at a value determined by a preliminary test. That is, when the target value for the filling flow rate is too large, the first and second check valves may be opened almost simultaneously, and the pressure variation may not show a stepwise change as discussed with reference to FIG. 2. For this reason, the target value for the filling flow rate may be set at a sufficiently small value.

In S3, the hydrogen station may obtain a value of the pressure variation using an output from the station pressure sensor and an output from the mass flow meter, while continuing filling of hydrogen gas. A particular value for the pressure variation may be computed in a station ECU using outputs from the station pressure sensor and the mass flow meter.

In S4, the hydrogen station may determine whether the value of the pressure variation obtained in S3 becomes a predetermined initial-pressure determination threshold or less which is set for detecting the opening of the second check valve, i.e., the occurrence of the second steepening of the pressure variation as described with reference to FIG. 2. If the determination in S4 is YES, the hydrogen station may obtain a station pressure when the value of the pressure variation becomes the initial-pressure determination threshold or less, and that pressure can be taken as the initial pressure in the currently connected hydrogen tank (see S5).

In S6, the hydrogen station may determine whether the initial pressure obtained in S5 is higher than a predetermined filling suspension threshold. If the decision in S6 is NO, the hydrogen station may perform main filling using the initial pressure obtained in S5 (see S7), and may move to S8 when the main filling ends. Alternatively, if the determination in S6 is YES, the hydrogen station may find that the current hydrogen tank is close to a substantially full-filled state, and does not require additional hydrogen gas, and may stop filling (see S8) and move to S9.

In S9, the hydrogen station may open an open valve to perform a vent operation in which the pressure in the station piping (more specifically, a section from the flow control valve to the filling nozzle in the station piping) is depressurized for preparing the next hydrogen gas filling for the hydrogen tank of another vehicle. This allows some of high-pressure hydrogen gas accumulating in the station piping to be introduced to a processing device (not shown) through a vent pipe. Such a vent operation can allow the pressure in the station piping to be lower than a predetermined minimum residual pressure expected for a common tank.

Alternatively, if the determination in S4 is NO, i.e., if the value of the pressure variation does not become the initial-pressure determination threshold or less, the hydrogen station may move to S10 and determine whether a predetermined time has passed since the start of initial filling. If the determination in S10 is NO, the hydrogen station may move to S3, and wait until the pressure variation becomes the initial-pressure determination threshold or less while continuing initial filling.

Note that the magnitude of steepening of the pressure variation is in inverse proportion to the volume of a connected hydrogen tank as described with reference to FIG. 2. Therefore, when the value of the pressure variation does not become the initial-pressure determination threshold or less even after a predetermined time has passed since the start of initial filling, the capacity of the hydrogen tank connected may be considered to be smaller than a size usually expected. Therefore, if the determination in S10 is YES, i.e., if the value of the pressure variation does not become the initial-pressure determination threshold or less while a predetermined time has passed since the start of initial filling, the hydrogen station may move to S8 to stop filling a hydrogen tank having a smaller-than-specification capacity with hydrogen gas.

The hydrogen gas filling method according to the first embodiment of the present invention is described above, but the present invention shall not be limited to this. Details in the configuration may appropriately be altered without departing the scope of the present invention.

For example, the pressure variation obtained in S4 is defined as the amount of change in the station pressure per unit mass [Pa/kg] in the above embodiment. However, the present invention shall not be limited to this. The pressure variation may be defined as the amount of change in the station pressure per unit time [Pa/sec] with expectation of similar effects.

Moreover, in the above embodiment, for example, the flow control valve is controlled in initial filling so that the filling flow rate of hydrogen gas is kept constant at a predetermined target value. However, the present invention shall not be limited to this. As described with reference to FIG. 2, the time required for establishing communication between the pressure accumulator in the hydrogen station and the hydrogen tank after initial filling is started, and the second check valve is opened, may become longer as the pressure in the hydrogen tank when the hydrogen tank is connected increases, and also may become longer as the filling flow rate of hydrogen gas during initial filling decreases. Therefore, the target value for the filling flow rate during initial filling is preferably adjusted in an appropriate manner according to the pressure in the hydrogen tank at that time in order to reduce the time required to obtain the initial pressure. During this, the fuel cell vehicle may transmit information about a tank internal pressure to the hydrogen station using an infrared communication device as described with reference to FIG. 1. Therefore, the hydrogen station may preferably set a target value for the filling flow rate using the information about the tank internal pressure transmitted from the vehicle. In this case, in order to reduce the time required to obtain the initial pressure as much as possible, the hydrogen station may preferably uses a larger target value for a larger tank internal pressure to increase the filling flow rate of hydrogen gas during initial filling.

Moreover, the vent operation is performed for preparing the next new filling (see S10) after stopping filling (see S9) or after completing main filling (see S7) in the above embodiment. However, a timing of performing the vent operation shall not be limited to this. The timing of performing the vent operation may be anywhere after stopping filling or after completing main filling but before starting the next initial filling.

<Second Embodiment>

Below, a second embodiment of the present invention will be described with reference to the figures. Note that illustrations and descriptions for those shared with the first embodiment are omitted when this embodiment is described below.

In the hydrogen gas filling method according to the first embodiment, an initial-pressure determination threshold is set for the pressure variation, and the initial pressure is obtained at a time when the value of the pressure variation obtained during initial filling becomes this initial-pressure determination threshold or less as described with reference to FIG. 3. Meanwhile, pressure loss may occur in the piping when connecting the hydrogen tank to the pressure accumulator through the piping, and supplying hydrogen gas to the hydrogen tank from the pressure accumulator. Further, this pressure loss becomes larger as the pressure in the hydrogen tank decreases and the volume flow rate of hydrogen gas increases. The pressure difference between the pressure accumulator side and the hydrogen tank side in the piping may also become larger when the pressure loss increases. If that is the case, the station pressure when the second check valve is opened may not reasonably be taken as the initial pressure. The hydrogen gas filling method according to this embodiment differs from that according to the first embodiment in that a timing of obtaining the initial pressure is determined considering the influence of the pressure loss which may occur in the piping.

Figure 4:
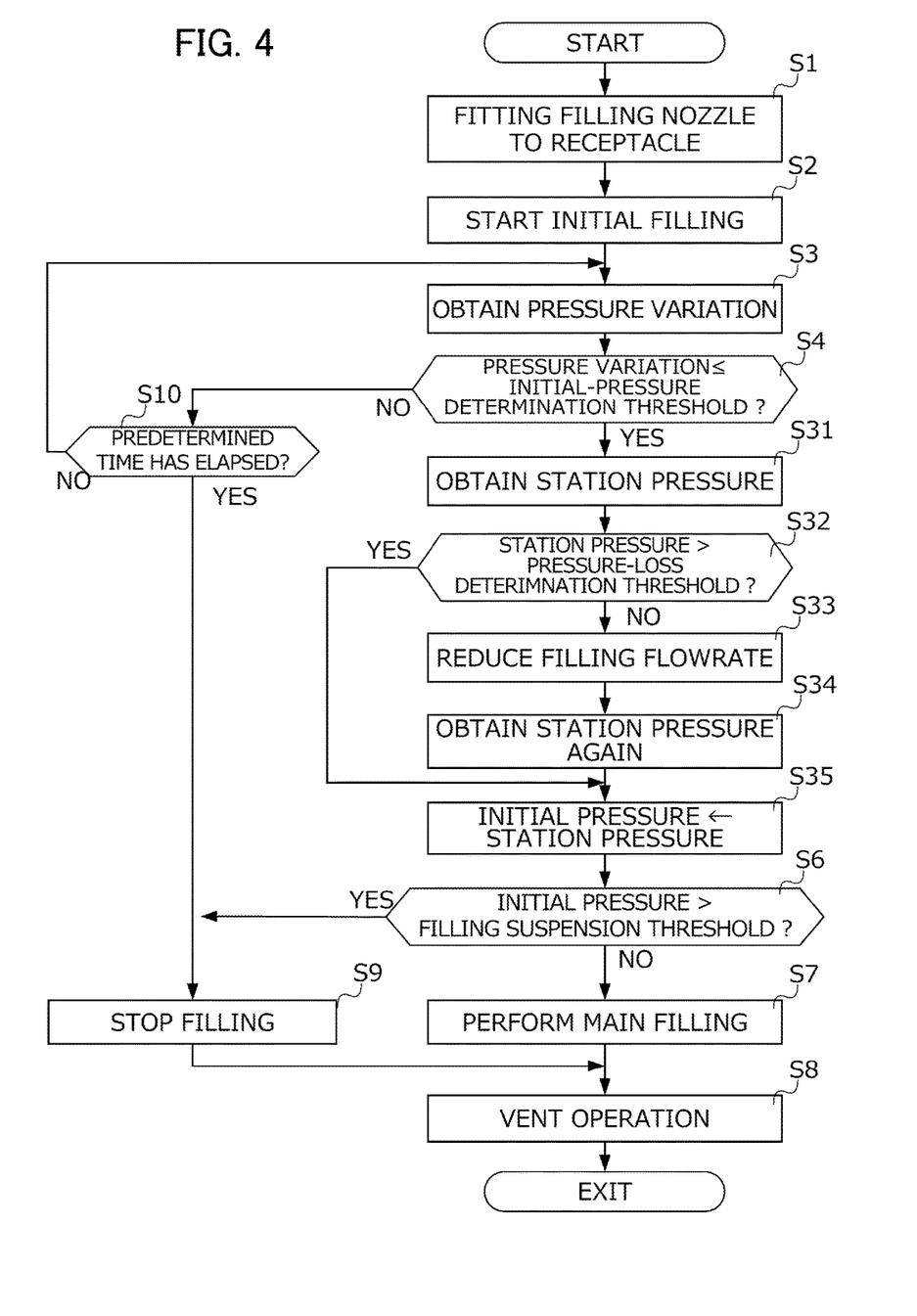
FIG. 4 is a flow chart illustrating a particular procedure of a hydrogen gas filling method according to a second embodiment of the present invention.
Figure 5:
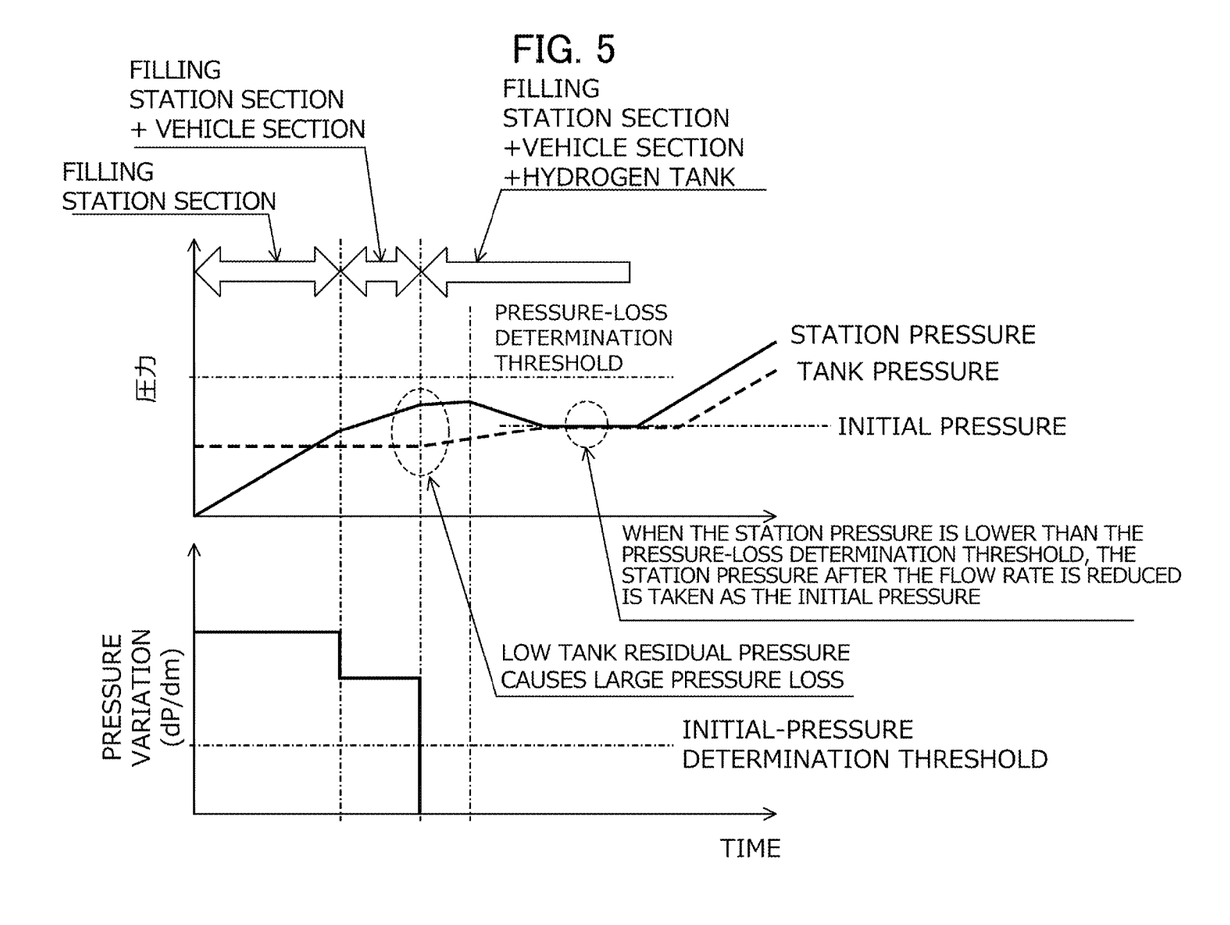
FIG. 5 is a timing diagram showing the changes in a station pressure, tank pressure and pressure variation when a hydrogen tank is filled with hydrogen gas according to the procedure as shown in the flow chart of FIG. 4.

FIG. 4 is a flow chart illustrating a particular procedure for the hydrogen gas filling method according to this embodiment. In the flow chart in FIG. 4, specific descriptions for those other than S31 to S35, to which the same symbols are assigned, are the same as in the flow chart in FIG. 3. Their details are omitted. FIG. 5 is a timing diagram showing the changes in the station pressure, tank pressure and pressure variation when a hydrogen tank is filled with hydrogen gas according to the procedure as shown in the flow chart of FIG. 4.

In S31, the hydrogen station may obtain a value of the station pressure when the value of the pressure variation becomes an initial-pressure determination threshold or less. In S32, the hydrogen station may determine whether the value of the station pressure obtained is larger than a pressure-loss determination threshold set for determining the magnitude of the pressure loss in the piping. If the determination in S32 is YES, the hydrogen station may find that the influence of the pressure loss due to the initial filling can be ignored, and the station pressure obtained in S31 can be taken as the initial pressure in the hydrogen tank currently connected (see S35).

If the determination in S32 is NO, the hydrogen station may find that the influence of the pressure loss due to initial filling is too large to be ignore, and may reduce the filling flow rate in order to reduce the pressure loss (see S33). In this case, the filling flow rate may be not only decreased, but also reduced to 0 to completely stop hydrogen gas filling. This can reduce the pressure loss to bring the station pressure closer to the pressure in the tank (see FIG. 5).

In S34, the hydrogen station may again obtain a value of the station pressure at a predetermined time after the filling flow rate is reduced in S33 (for example, after a certain time has passed enough to allow the value of the station pressure to converge at a predetermined value). In S35, the hydrogen station may take the station pressure obtained in S34 as the initial pressure in the hydrogen tank currently connected.

The hydrogen gas filling method according to the second embodiment of the present invention is described above, but the present invention shall not be limited to this. Details in the configuration may appropriately be altered without departing the scope of the present invention.

<Third Embodiment>

Next, a third embodiment of the present invention will be described with reference to the figures. Note that illustrations and descriptions for those shared with the first embodiment are omitted when this embodiment is described below.

In the hydrogen gas filling method according to the first embodiment, an initial-pressure determination threshold is set for the pressure variation, and the initial pressure is obtained at a time when the value of the pressure variation obtained during initial filling becomes this initial-pressure determination threshold or less as described with reference to FIG. 3. The hydrogen gas filling method according to this embodiment differs from that according to the first embodiment by a way of determining a timing of obtaining the initial pressure. The hydrogen gas filling method according to this embodiment differs from the hydrogen gas filling method according to the first embodiment in that a timing of obtaining the initial pressure is determined without setting an initial-pressure determination threshold for the pressure variation.

Figure 6:
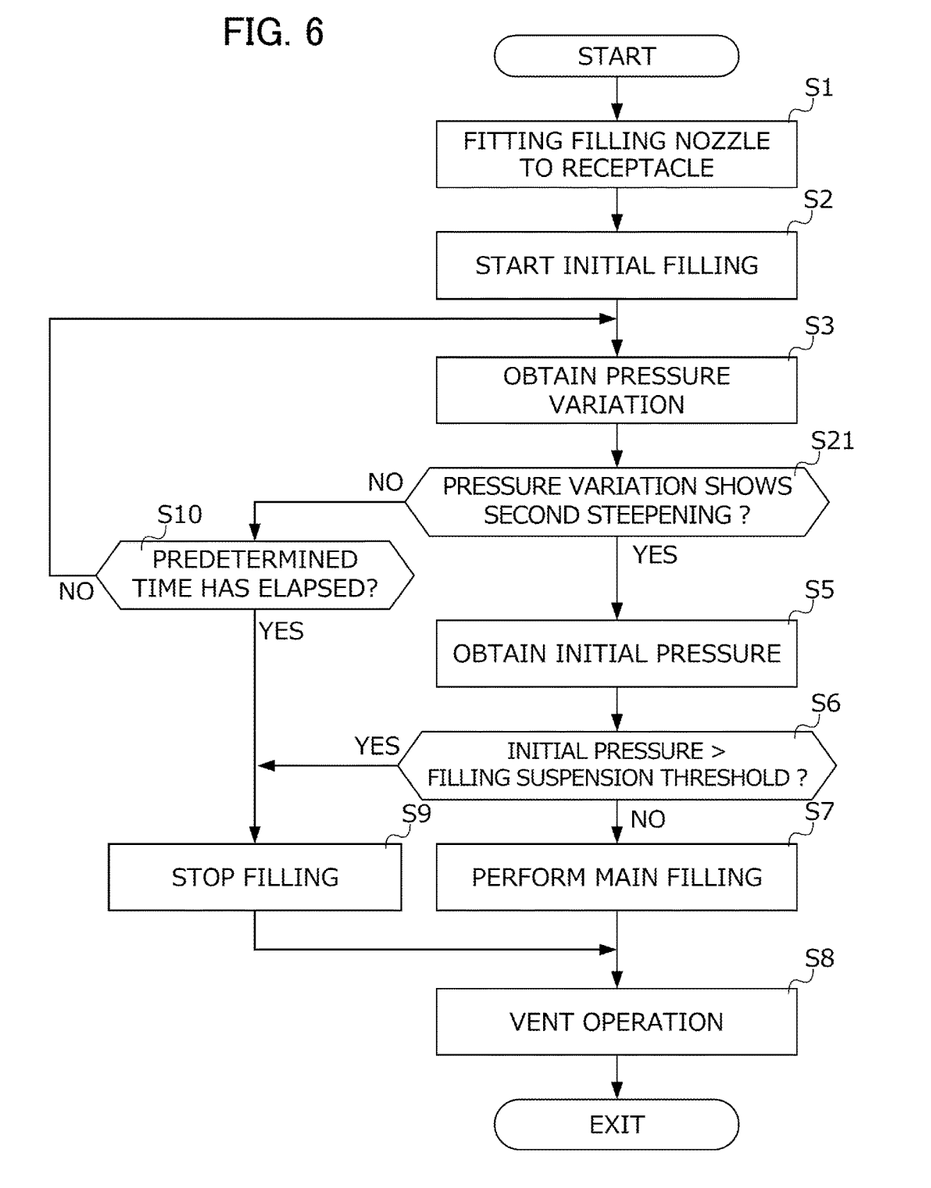
FIG. 6 is a flow chart illustrating a particular procedure of the hydrogen gas filling method according to the second embodiment of the present invention.

FIG. 6 is a flow chart illustrating a particular procedure for the hydrogen gas filling method according to this embodiment. In the flow chart in FIG. 6, specific descriptions for those other than S21 are the same as is the flow chart in FIG. 3. Their details are thus omitted.

After obtaining the pressure variation in S3, the hydrogen station may determine whether the second steepening as shown in FIG. 2 occurs to the pressure variation after starting initial filling. That is, since two check valves: the first and second check valves are provided in the piping connecting the pressure accumulator in the hydrogen station to the hydrogen tank as shown in FIG. 2, the pressure variation during initial filling shows two-step stepwise decrease. That is, the time dependent pressure variation shows the first steepening (a drop in the pressure variation) when the first check valve is opened, and the second steepening when the second check valve is opened. Further, the volume of the system significantly changes when the second check valve is opened, and thus the magnitude of the second steepening is larger than that of the first one. If the determination in S21 is YES, the hydrogen station may obtain the station pressure when the second steepening as described above occurs, and that pressure can be taken as the initial pressure in the hydrogen tank currently connected (see S5).

Note that whether the pressure variation shows a steepening or not can be determined by computing a derivative value with respect to time for the pressure variation, and checking if that value is a predetermined value or less. Therefore, in S21, the hydrogen station may compute, for example, a derivative value with respect to time for the pressure variation, and use the derivative value with respect to time to determine whether the pressure variation shows the second steepening or not.

The hydrogen gas filling method according to the third embodiment of the present invention is described above, but the present invention shall not be limited to this. Details in the configuration may appropriately be altered without departing the scope of the present invention.

What is claimed is:

1. A gas filling method performed in a predetermined gas filling system for connecting a supply source of compressed gas to a tank mounted on a mobile object via a piping, the piping including a downstream piping, and the downstream piping including a first check valve and a second check valve, the method comprising:
    filling the tank with the gas from the supply source;
    an initial-filling initiation step of opening a flow control valve provided in the piping to start initial filling to achieve a first target pressure at a predetermined detection point downstream of the flow control valve, the downstream piping located downstream of the flow control valve;
    a pressure-variation acquisition step of obtaining a pressure variation per unit time or per unit mass at the predetermined detection point;
    an initial-pressure detection step of obtaining a pressure at the detection point at a time specified using the pressure variation, and taking that pressure as the initial pressure in the tank;
    a main-filling initiation step of starting main filling using the initial pressure;
    when the first target pressure is achieved, opening the first check valve to pressurize the predetermined detection point to a second target pressure; and
    when the second target pressure is achieved, completing the main filling by opening the second check valve.

2. The gas filling method according to claim 1, wherein the flow control valve is controlled so that the flow rate of the gas which flows through the piping becomes constant in the initial filling.

3. The gas filling method according to claim 2, wherein the pressure at the detection point is obtained when the pressure variation becomes a predetermined initial-pressure determination threshold or less, and that pressure is taken as the initial pressure in the initial-pressure detection step.

4. The gas filling method according to claim 1, wherein if the pressure at the detection point when the pressure variation becomes the predetermined initial-pressure determination threshold or less becomes higher than a predetermined pressure-loss determination threshold, that pressure is taken as the initial pressure in the initial-pressure detection step.

5. The gas filling method according to claim 4, the method comprising a pressure-loss reducing step of reducing the flow rate of the gas which flows through the piping if the pressure at the detection point when the pressure variation becomes the predetermined initial-pressure determination threshold or less becomes the predetermined pressure-loss determination threshold or less after starting the initial filling,
    wherein the initial-pressure detection step comprises obtaining a pressure at the detection point after reducing the flow rate of the gas in the pressure-loss reducing step, and that pressure is taken as the initial pressure.

6. The gas filling method according to claim 3, further comprising a filling stop step of stopping filling if the pressure variation does not become the initial-pressure determination threshold or less within a predetermined time after starting the initial filling.

7. The gas filling method according to claim 1,
    wherein the piping comprises
        an upstream piping including a filling nozzle for discharging the gas, connected to the supply source via the flow control valve,
    wherein the downstream piping includes a receptacle capable of being fitted with the filling nozzle and connected to the tank,
    wherein the detection point is located between the flow control valve and the filling nozzle in the upstream piping,
    and
    wherein the pressure variation is assumed to decrease in two steps in a stepwise manner, and the pressure at the detection point is obtained when the pressure variation shows the second steepening after starting the initial filling and that pressure is taken as the initial pressure, in the initial-pressure detection step.

8. The gas filling method according to claim 7, further comprising a filling stop step of stopping filling if the pressure variation does not show the second steepening within a predetermined time after starting the initial filling.

9. The gas filling method according to claim 1,
    wherein the piping comprises
        an upstream piping including a filling nozzle for discharging the gas, connected to the supply source via the flow valve,
    wherein the downstream piping includes a receptacle capable of being fitted with the filling nozzle and connected to the tank,
    wherein the detection point is located between the flow control valve and the filling nozzle in the upstream piping, and
    wherein the method further comprises a depressurization step of reducing a pressure at the detection point in the upstream piping below a predetermined minimum residual pressure expected in the tank after the end of main filling but before the start of a next initial filling.

10. The gas filling method according to claim 1, wherein the mobile object comprises the tank, a tank internal pressure sensor for detecting pressure in the tank and a transmitter for transmitting information about a tank internal pressure detected with the tank internal pressure sensor,
    wherein the method further comprises a communication step of obtaining the information about the tank internal pressure transmitted from the transmitter before starting the initial-filling initiation step, and
    wherein the flow rate of the gas is increased as a pressure in the tank estimated with the information obtained in the communication step increases, in the initial-filling.

11. The gas filling method according to claim 1, wherein the pressure at the detection point is obtained when the pressure variation becomes a predetermined initial-pressure determination threshold or less, and that pressure is taken as the initial pressure in the initial-pressure detection step.

12. The gas filling method according to claim 2, wherein if the pressure at the detection point when the pressure variation becomes the predetermined initial-pressure determination threshold or less becomes higher than a predetermined pressure-loss determination threshold, that pressure is taken as the initial pressure in the initial-pressure detection step.

13. The gas filling method according to claim 4, further comprising a filling stop step of stopping filling if the pressure variation does not become the initial-pressure determination threshold or less within a predetermined time after starting the initial filling.

14. The gas filling method according to claim 5, further comprising a filling stop step of stopping filling if the pressure variation does not become the initial-pressure determination threshold or less within a predetermined time after starting the initial filling.

15. The gas filling method according to claim 2,
wherein the piping comprises
an upstream piping including a filling nozzle for discharging the gas, connected to the supply source via the flow control valve,
wherein the downstream includes including a receptacle capable of being fitted with the filling nozzle and connected to the tank,
wherein the detection point is located between the flow control valve and the filling nozzle in the upstream piping,
and
wherein the pressure variation is assumed to decrease in two steps in a stepwise manner, and the pressure at the detection point is obtained when the pressure variation shows the second steepening after starting the initial filling and that pressure is taken as the initial pressure, in the initial-pressure detection step.

16. The gas filling method according to claim 2,
wherein the piping comprises
an upstream piping including a filling nozzle for discharging the gas, connected to the supply source via the flow control valve,
wherein the downstream piping including includes a receptacle capable of being fitted with the filling nozzle and connected to the tank,
wherein the detection point is located between the flow control valve and the filling nozzle in the upstream piping, and
wherein the method further comprises a depressurization step of reducing a pressure at the detection point in the upstream piping below a predetermined minimum residual pressure expected in the tank after the end of main filling but before the start of a next initial filling.

17. The gas filling method according to claim 2, wherein the mobile object comprises the tank, a tank internal pressure sensor for detecting pressure in the tank and a transmitter for transmitting information about a tank internal pressure detected with the tank internal pressure sensor,
wherein the method further comprises a communication step of obtaining the information about the tank internal pressure transmitted from the transmitter before starting the initial-filling initiation step, and
wherein the flow rate of the gas is increased as a pressure in the tank estimated with the information obtained in the communication step increases, in the initial-filling.

* * * * *